United States Patent [19]

Kalmanash

[11] Patent Number: 5,211,463

[45] Date of Patent: May 18, 1993

[54] BACKLIGHT FOR LIQUID CRYSTAL DEVICES

[75] Inventor: Michael H. Kalmanash, Los Altos, Calif.

[73] Assignee: Kaiser Aerospace & Electronics Corporation, Foster City, Calif.

[21] Appl. No.: 850,391

[22] Filed: Mar. 11, 1992

[51] Int. Cl.$^5$ .............................. F21V 9/04; F21Y 8/00
[52] U.S. Cl. ....................................... 362/26; 362/31; 362/23; 362/253; 362/62
[58] Field of Search ................. 362/26, 32, 62, 227, 362/230, 231, 237, 293, 800

[56] References Cited

U.S. PATENT DOCUMENTS

| | | | |
|---|---|---|---|
| 4,277,817 | 7/1981 | Hear | 362/26 |
| 4,934,783 | 6/1990 | Klein | 362/62 |
| 4,998,804 | 3/1991 | Horiuchi | 362/26 |
| 5,143,433 | 9/1992 | Farrell | 362/31 |
| 5,146,354 | 9/1992 | Plesinger | 362/31 |

*Primary Examiner*—Richard R. Cole
*Attorney, Agent, or Firm*—Marvin H. Kleinberg

[57] ABSTRACT

A backlight system for liquid crystal device display is equipped with a dual lighting system for day viewing and compatible with night vision systems. The day lighting system uses conventional fluorescent or incandescent lamps for full color display during daytime use. The night lighting system uses a light source which is either filtered to remove infrared and near infrared wavelengths or which is chosen from a class of sources which does not emit such wavelengths. The day lighting system is disabled while the night system is in use.

33 Claims, 4 Drawing Sheets

BACKLIGHT FOR LIQUID CRYSTAL DEVICES

BACKGROUND OF THE INVENTION

The present invention relates to display devices and, more particularly, to an improved backlight system for liquid crystal device ("LCD") displays, designed for use in daytime, and with night vision imaging systems.

1. Review of the Prior Art.

LCD's have been employed as modulators of light, and, as such, have been extensively employed in various devices as displays for information in various forms and formats. Reflective LCD's rely upon impinging illumination which enters the face of the device, is reflected from a rear surface, and exits the face. Reflective LCD's have the advantages of lower power requirements, and reductions in size and weight compared to transmissive LCD's, which must have illumination sources.

Typical uses of reflective LCD's are in wrist watch faces and some lap top computer screens. These require ambient light to provide the contrast between the light transmissive and opaque portions of the display. Reflective LCD's do not work effectively in a dimly lighted environment, and are completely ineffective in darkness. Some watchmakers solve that problem by providing a small light source in the watch to illuminate the face, creating the necessary contrast between light and dark. However, some of the benefit of the reflective device (i.e., lower power and fewer components) is lost thereby.

While suffering in the presence of low ambient illumination, the reflective device is also sensitive to the light transmissive ability of the LCD, since the luminance of the display is dependent upon the square of the transmission of light through the LCD. This is because the ambient light must travel through the LCD to the reflective surface and then back out through the LCD again.

Typically, a monochrome twisted nematic LCD, such as are used in watch faces, can have light transmission of up to 35%. This is adequate for reflective mode viewing, where the luminance level of the display will be about 10% of the viewing ambient.

In contrast, Full Color, active matrix LCD displays must use artificial illumination devices due to the extremely low rate of light transmission through the display. Creating a color display requires the incorporation of absorptive color dye filter mosaics along with complex, integral addressing structures. The absorptive dyes and addressing structures allow light transmissions in the range of less than 5%, and in the reflective mode would have a luminance of approximately 0.25% of the ambient light level, which is unacceptably low.

A typical backlight illumination source is a fluorescent lamp, which has the requisite properties of high efficiency, long life and good color balance (i.e., transmits the full range of frequencies within the visible spectrum in their normal concentrations).

Transmissive color LCD displays have found application in color television projection systems and in "flat screen" color displays for computer systems. Yet another application for such devices is in avionics multifunction displays, which are required to present both full-color graphics and multi-gray scale video imagery. Such a display must have high brightness and contrast for good sunlight viewing, as well as a wide dimming range for night time operation.

Another requirement for avionic displays is compatibility with night vision goggles, which are used to view exterior scenes under totally dark conditions. Such night vision devices employ high gain electronic image intensifiers that are sensitive to light in the near-infrared and infrared spectral regions. To be compatible with such systems, cockpit displays must provide sufficient brightness for direct viewing with the unaided dark adapted eye, while, at the same time not emit energy in that portion of the spectrum that might saturate the night vision equipment or cause a reduction in image intensifier gain. Further, the display should not otherwise adversely effect the ability of such equipment to provide real-world night vision. The quantitative requirements for compatibility with such devices is given in Military Specification MIL-L-85762A, dated Aug. 26, 1988.

While these are seemingly contradictory requirements, they are compatible because the spectral region of maximum night vision equipment sensitivity is not coextensive with the spectral region of maximum human visual sensitivity. Night vision equipment is most sensitive to light in the infrared region (approx. 780 nm) while the human eye is most sensitive to light in the yellow-green region (approx. 550 nm). Accordingly, one could filter the display emissions to minimize the longer wavelength components that would otherwise interfere with the night vision equipment without adversely affecting that portion of the visible spectrum to which the human eye is most sensitive.

In dealing with a cockpit display that uses a backlit LCD, whose emission is mainly in the shorter wavelengths (i.e. green-blue), the back light can be easily filtered to remove the infrared and near infrared components without adversely affecting the display luminance. However, there is a penalty associated with this scheme whenever a multi-color display is involved. That is because the sensitivity of the night vision systems extends into the "red" region for some devices (Class B of MIL-L-85762A) and into the "red-orange" region for more sensitive devices (Class A of MIL-L-85762A). Some night vision systems are so sensitive that display emissions within the range of sensitivity must be strongly attenuated, including those in the visible red and red-orange region of the spectrum.

Attenuation of the longer wavelength portions of the visible spectrum reduces the brightness of the colors "red" and "red-orange", and can distort the display color balance. However, the color balance can be partially restored by adjusting the primary color emission ratios in the backlight lamps. The net result is a reduction in luminous efficiency, a lowering of peak display brightness and high ambient contrast, and a degradation of sunlight readability.

Driving the backlight lamps "harder" to achieve higher brightness levels for the non night vision applications will partially ameliorate the problem, but at the cost of higher overall power dissipation, increased weight and shorter lamp life.

With a monochrome LCD display, prior art approaches have utilized a light source with an infrared attenuating filter to achieve compatibility with night vision equipment. One such system is disclosed in the recent patent to Klein, U.S. Pat. No. 4,934,793. Such a system is subject to all of the shortcomings outlined above, should a full color system be employed.

Sanai et al., U.S. Pat No. 5,029,045, Horiuchi, U.S. Pat. No. 4,998,804, and Suzawa, U.S. Pat. No. 4,618,216 teach the full-color illumination of LCD's, while Tanaka et al., U.S. Pat. No. 5,040,098, allows illumination of monochromatic LCD displays whose color attribute is adjusted by means of organic fluorescent dyes. The LCD illumination device of Hamada, U.S. Pat. No. 4,914,553 utilizes a Fresnel reflection surface, and can be used with either built-in or external light sources. Masuzawa et al., U.S. Pat. No. 4,642,736, teaches a light diffuser for normal illumination of various types of machinery as well as LCD devices. None of these references are intended for use with modern night vision goggles.

Other prior art devices for illuminating conventional, non-LCD panel instruments to be useful with night vision goggles include Garret, U.S. Pat. No. 4,887,189, and Reiter et al., U.S. Pat. No. 4,581,683. The device taught in Garret uses a "hot", incandescent light bulb that requires filters to remove unwanted wavelengths of light in the red and infrared band, and teaches a method of cooling the bulb to prevent premature burnout. The device in Reiter is specifically designed to emit only green light, and, accordingly, each is even less applicable for use with full color LCD's.

The primary object of the present invention is to permit the reading of an LCD display at night with or without the use of night vision goggles, and with no diminution of system efficiency or readability during the course of daylight viewing.

SUMMARY OF THE INVENTION

In order to achieve a full-color LCD display during daytime operation, which is also compatible with night vision goggles when the device is being used at night, the present invention utilizes separate lamps for day and night operation.

For daytime viewability, high efficiency "day" lamps are used that need not comply with night vision system requirements. The display so illuminated is characterized by high luminous efficiency, good color separation, high brightness and high contrast, with no reduction in the quality of the any color bands, including red or red-orange. Compatibility with night vision systems is achieved by using dedicated "night" lamps which emit little or no infrared, or near infrared energy. Alternatively, full spectrum "night" lamps can be used in conjunction with infrared and red or red-orange absorbing filters. Such lamps do not need to illuminate the LCD brightly for night viewing and the emission profile in the visible spectrum can be adjusted so that a substantially full color display is experienced.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DESCRIPTION OF THE PREFERRED EMBODIMENTS

Figure 1:
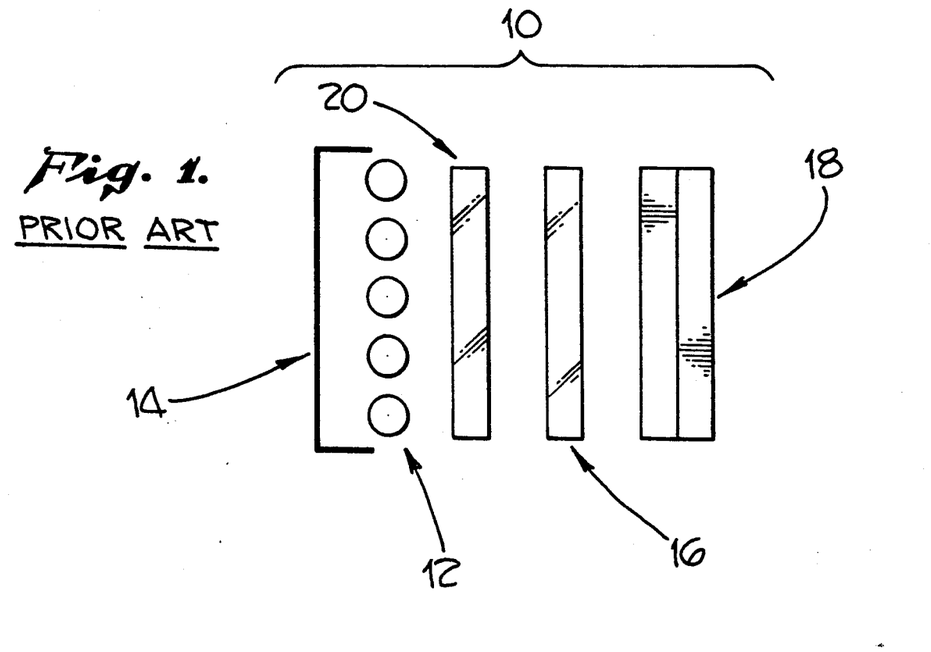
FIG. 1 is an exploded side view of a prior art backlit LCD structure.

FIG. 1 illustrates a conventional LCD backlight structure 10 using a set of high efficiency, high brightness, fluorescent lamps 12 mounted in a reflector housing 14 to enhance the overall luminous efficiency. The structure also incorporates a diffuser plate 16, which scatters the light rays from the individual lamps 12, to create a uniform luminance plane behind an LCD display 18.

If the conventional LCD backlight 10 of FIG. 1 were to be used with night vision systems, an optical filter 20 would be placed in proximity to the diffuser plate 16 to eliminate the unwanted infrared and near infrared wavelengths. Typically, this filter 20 could be an infrared absorptive element constructed of CM-500 glass (made by Hoya, Inc.), or a similar material. Alternatively, a filter which is an infrared reflective element made of a custom designed thin film interference filter could be employed. Either filter combination prevents the emission of that portion of the visible light spectrum that could compromise visual performance of the LCD 18 in the presence of a night vision system.

The absorptive elements in such glass filters 20, although designed for high absorption at longer wavelengths in the infrared region of the spectrum and high transmission at shorter wavelengths in the visual region, absorb significant amounts of light within the visual spectrum as well, especially toward the longer wavelengths. Thus, where the filter 20 adequately attenuates the infrared wavelengths, it also absorbs light well into the visual spectrum, lowering display brightness and altering color balance of the LCD 18.

The alternative interference filter described above has a sharper transition between high absorption and high transmission, but its ability to filter light effectively is angle-dependent. The use of a reflective infrared interference filter for night vision system compatibility would, therefore, alter the viewing angle characteristics of the LCD display 18, increasing the color shift for off-axis viewing.

Figure 2:
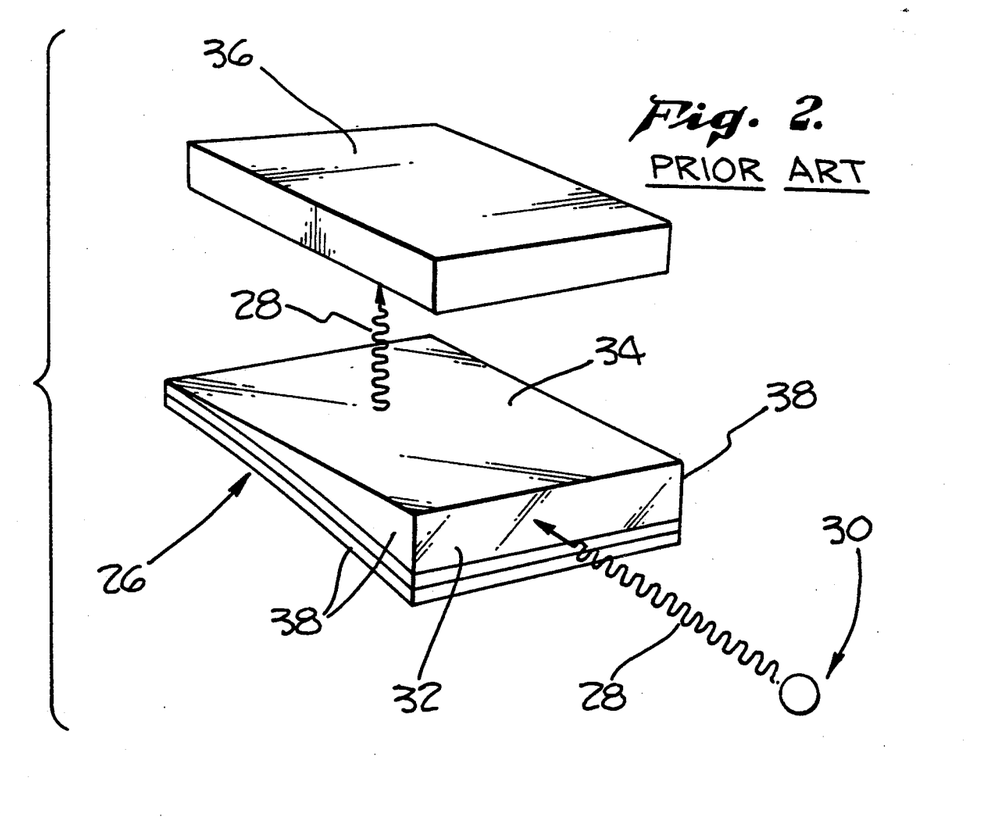
FIG. 2 is a prior art wedge-shaped edgelit block.

A prior are example of an edge lighting technique is a wedge-shaped edge-lit panel 26, as described in Hehr, U.S. Pat. No. 4,277,817, and is shown in FIG. 2. The panel 26 is usually made of glass or plastic. Incident light 28 from lamp 30 enters the wedge-shaped block 26 through the edge surface 32 of the block 26. Total internal reflection of the light 28 occurs until the critical angle is exceeded, at which point the light 28 exits the block 26 through the face 34 to illuminate an LCD 36 located above the block emission surface 34.

Shaping the edge surface 32 into a spherical, parabolic or other curvature is sometimes used to improve uniformity from the edge lighting source, particularly for large area devices, as is more fully described in Hehr, Suzawa, U.S. Pat. No. 4,618,216, and Hathaway, et al, *New Backlighting Technologies for LCD's*, 91 SID Digest, pp. 751-54.

In addition, bottom surface treatments can be used to shape the emission envelope of the wedge block 26 for higher brightness. See Suzawa. These include microgrooves, microbeads, or the inclusion of a light scattering plate. Edgelit panels are usually described as having a reflective coating 38 or material applied to all surfaces except the one in which light is intended to exit in order to improve efficiency, as described in Hehr, Suzawa, Hathaway and Shaw, U.S, Pat. No. 4,974,122.

Figure 3:
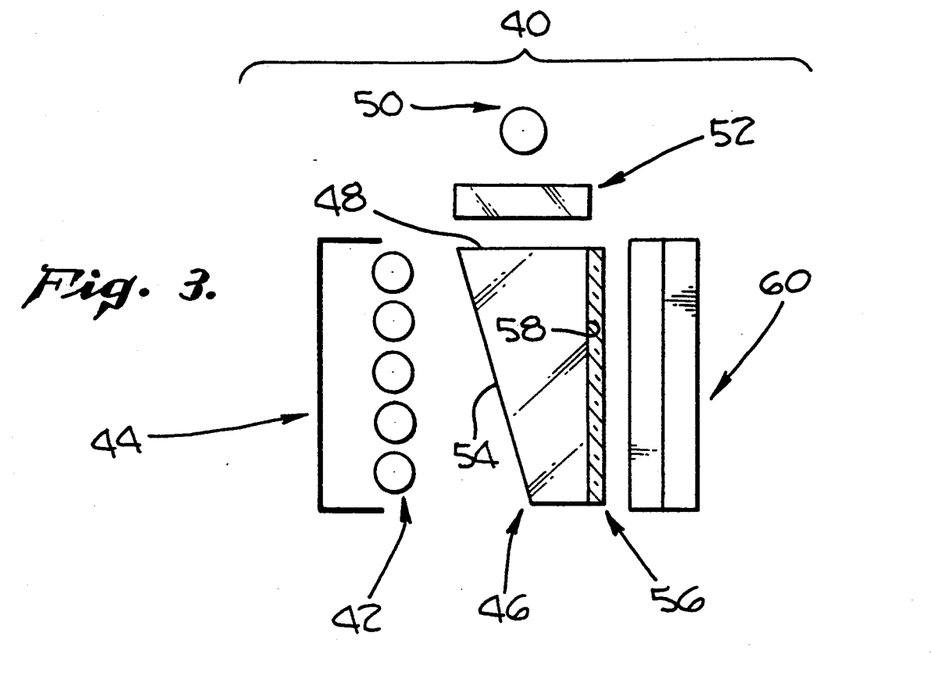
FIG. 3 is an exploded side view of an LCD backlight device according to the present invention, which uses a back light for day viewing and is edgelit for night viewing.

FIG. 3 is illustrative of a display assembly panel 40 of the present invention, and shows the combination of a high brightness fluorescent backlight 42, coupled with reflective surface 44, for day viewing, and an edge-lit, wedge-shaped block 46 illuminated through the edge surface 48 of the block 46 with light from night lamp 50, which is made compatible with night vision goggles. External drive circuitry permits independent adjustment of the luminance of lamps 42 and lamp 50. The two sets of lamps 42, 50 operate under complementary conditions. For day viewing, or night viewing without night vision goggles, only the high brightness, fluorescent backlighting lamps 42 are illuminated. During use with night vision goggles, only the edge lighting night lamp 50 is illuminated. Obviously, though, the night lamp 50 can be operated in combination with the day lamps 42 without untoward effects during daylight viewing because of its low luminance compared to lamps 42.

The lighting system 40 is made compatible with night vision systems either by selecting the night lamp 50 from a class of lamps which do not emit light of the unwanted wavelengths in the infrared or near infrared ranges, or by adding either an absorptive or reflective filter 52 between the night lamp 50 and the edge surface 48 of the wedge shaped block 46. The latter would require a change in the emission characteristics of the night lamp 50 (compared to the day lamps 42) to preserve similar colors for both night and day operation since, as has been mentioned, filtration to remove infrared light also tends to attenuate the longer wavelengths within the visible spectrum. In either case, no filtration of the day fluorescent lamps 42 is required, resulting in higher luminous efficiency and better color separation for day viewing.

In the present invention as shown in FIG. 3, the edgelit wedge-shaped block 46 also functions as a diffuser for the day lamps 42. Therefore, rather than putting a reflective surface behind the wedge-shaped block as in FIG. 2, the reflecting surface 44 is instead placed behind the fluorescent day lamps 42. This permits the transmission of light from the day lamps 42 through the under surface 54 of the wedge-shaped block 46 without being impeded by a reflective coating which might otherwise be placed on the underside 54 of the wedge-shaped block 46 as in FIG. 2. A diffuser plate 56 is placed at the front surface 58 of the edgelit panel to enable good uniformity of light transmission from the day lamps 42 and the night lamp 50 through the LCD 60.

The night lamp 50 for this application could be incandescent, fluorescent, or of other lamp types, any of which are within the scope of this invention. In a preferred embodiment, a miniature, cold cathode fluorescent lamp is used. The cold cathode structure has lower efficiency than the hot cathode fluorescent lamps typically used for the high brightness day lamps, but such brightness is not important for night viewing. A reflector housing could be used for the night lamp similar to that used for the day lamps, but a better solution is to use an aperture lamp, incorporating an internal reflector and only emitting light in a narrow slit facing the edgelit panel.

More significant is the absence of the hot cathode structure, which eliminates a significant source of infrared emission and which simplifies the night vision system light filtering requirements. One advantage of fluorescent lamps for both day and night viewing is the broad color gamut that can be tailored by judicious selection of the phosphor components.

Figure 4:
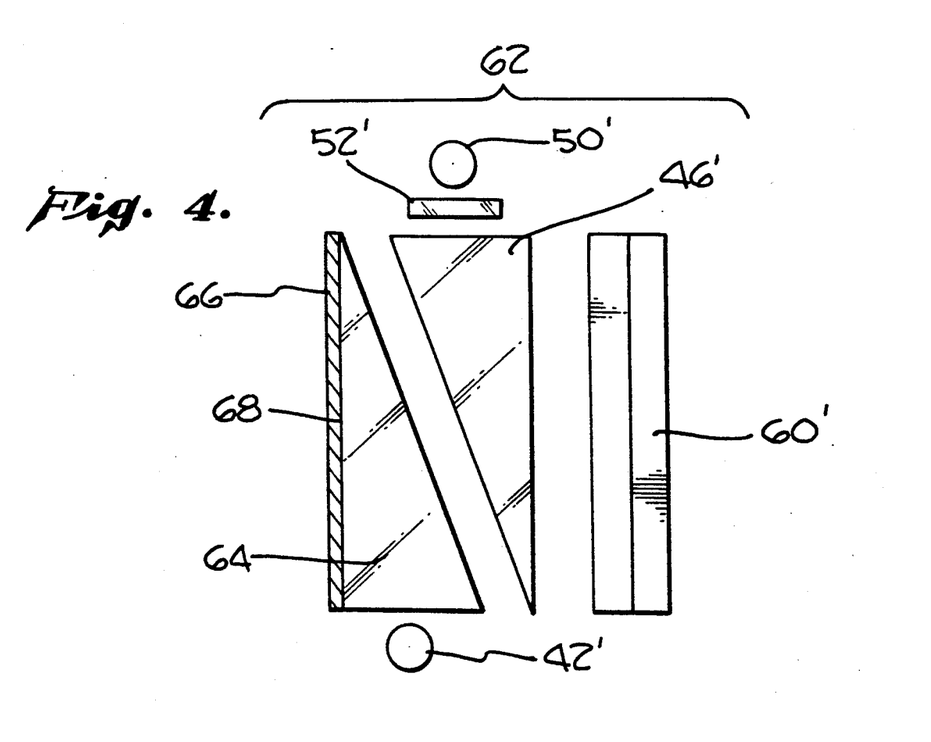
FIG. 4 is an exploded side view of a dual edgelit backlight for day and night viewing of an LCD.

In another embodiment shown in FIG. 4, a display assembly 62 contains a second edge-lit, wedge-shaped block 64 placed behind the first wedge-shaped block 46'. The second wedge-shaped block 64 has a reflective coating 66 on the undersurface 68 of the second block 64 to increase the uniformity and quality of light illuminating the LCD 60'. In this configuration, both the day and night lamps 42', 50' are arranged in edge-lit fashion, allowing the display assembly 62 of FIG. 4 to be thinner than the assembly 40 in FIG. 3. The reduction in overall depth of the LCD lighting assembly 62 in FIG. 4 is due to the elimination of some of the components that are necessary for the backlighting in FIG. 3 (i.e., the backlight assembly 42).

As in the first embodiment, the day and night lamps 42', 50' operate in a complementary manner. Both are aperture fluorescent lamps, though the day lamp 42' has a hot cathode structure for higher efficiency. However, the two blocks 46', 64 are sandwiched together to form essentially a rectangular prism.

Finally, although the backlighting assembly 62 in FIG. 4 has a first block 46' being illuminated by the night lamp 50', and a second block 64 by the day lamp 42', the reverse of this configuration would be equally effective.

Figure 5:
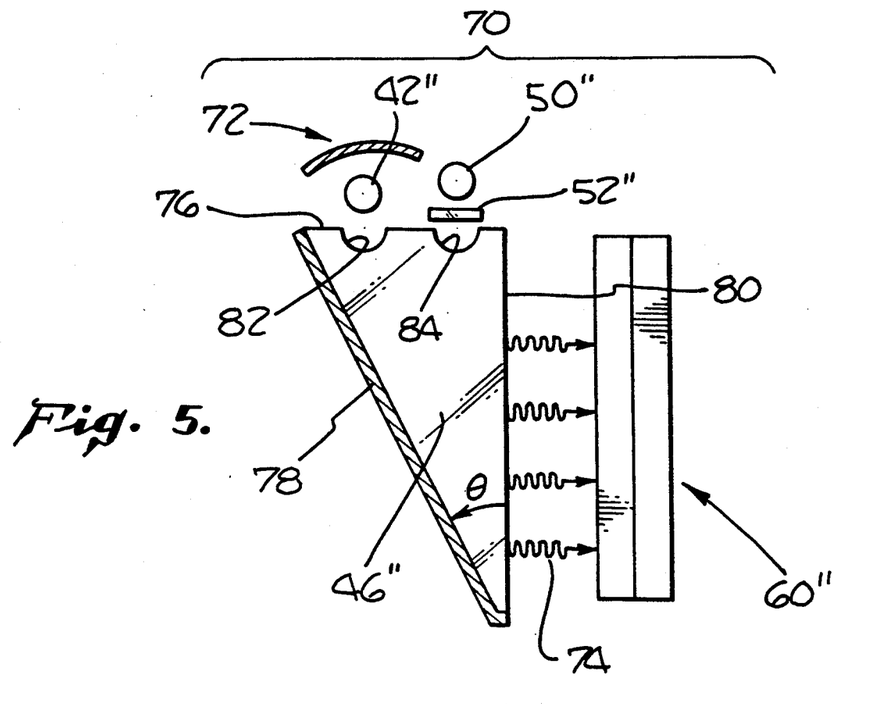
FIG. 5 is a three-dimensional top view of a generally rectangular block used to reflect light toward an LCD.

In another embodiment shown in FIG. 5, a dual edge-lit device 70 has both the day and night lamps 42", 50", respectively, in an edgelight configuration with a wedge-shaped block 46". The day and night lamps 42", 50" are adjacent to one another, with night vision filtering 52' applied only to the night lamp 50". Alternatively, the night lamp 50" can be chosen from a class of lamps with greatly reduced infrared and near infrared emissions.

As in the embodiments shown in FIGS. 3 and 4, the lamps 42", 50" are operated in a complementary manner: the day lamp 42" is operable only during daylight viewing or nighttime viewing without night vision goggles, while the night lamp 50" is operable during nighttime viewing with night vision goggles. The assembly 70 in FIG. 5, like the assembly 62 that in FIG. 4, has the same advantage over the display assembly 40 in FIG. 3 in that it is thinner.

The angle $\theta$ of the wedge-shaped block 46" in this configuration must be chosen to accommodate the locations of the day and night lamps 42", 50" in order to maximize luminosity of the light 74, which first enters the block through edge surface 76 of the block 46", is reflected by a reflective surface 78 on the underside of the block 46", and emerges from the top surface 80 of the block 46" to illuminate the LCD 60". The angle $\theta$ is dependent upon the distance of the lamps 64, 66 from the edge surface 76 of the block 68, as well as the space between them. The edge surface 76 preferably contains first and second curved recesses, 82, 84 to improve the quality of light entering the wedge-shaped block 46″.

Figure 6:
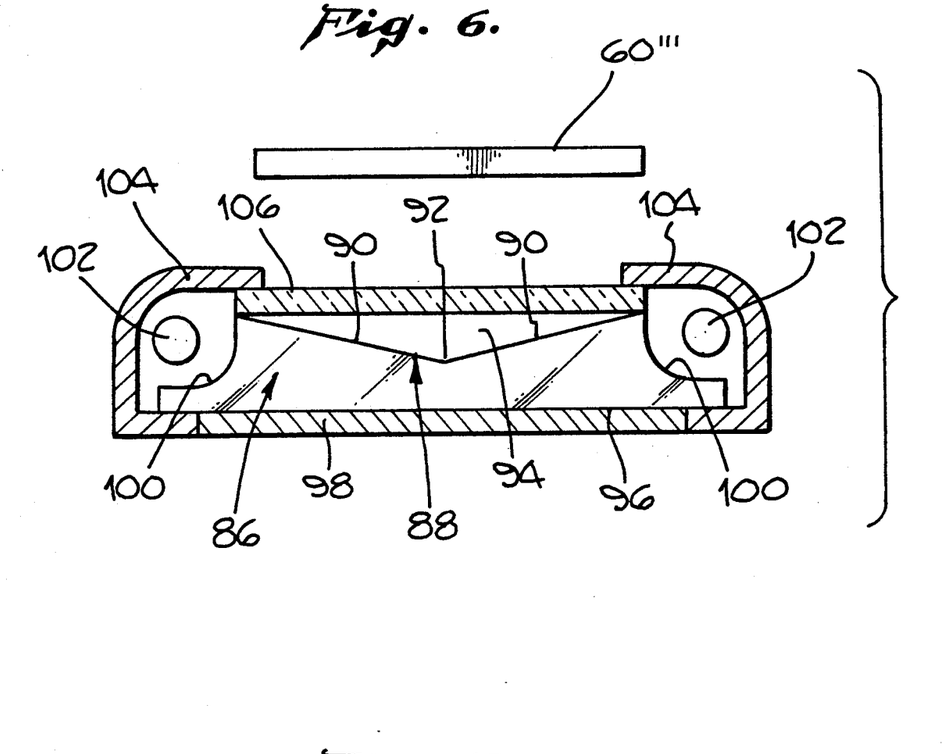
FIG. 6 is a cross-sectional view of a complete dual sided, dual edgelit backlight device employing the block shown in FIG. 5, for day and night LCD viewing.
Figure 7:
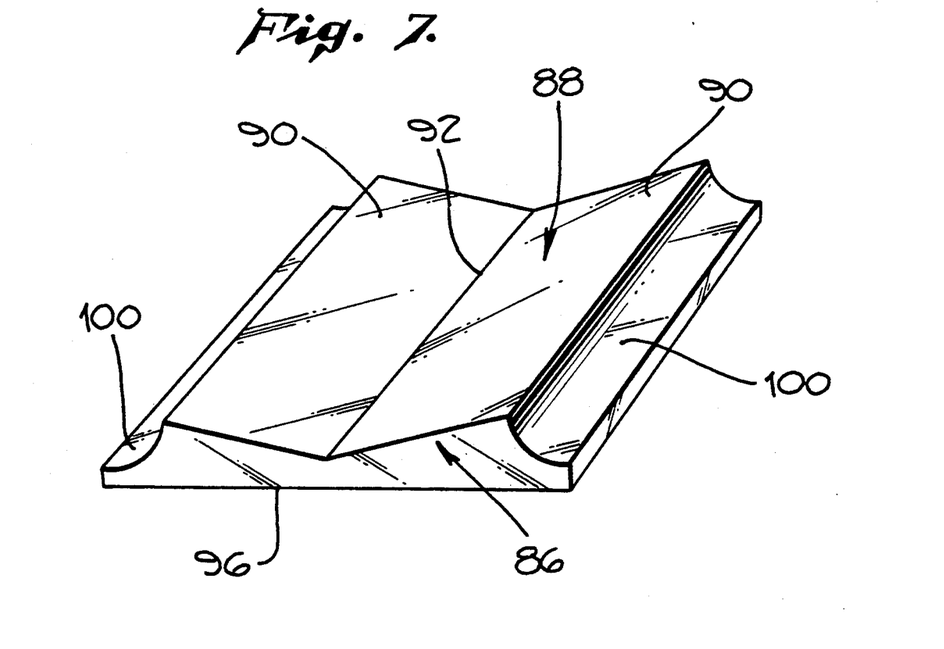
FIG. 7 is a perspective view of the block of FIG. 6.

The embodiment of the invention shown in FIGS. 6 and 7 adapts the prior art structure of Tanaka, which essentially integrates two wedge-shaped blocks to form a generally rectangular block 86. The top surface 88 is formed by two planar surfaces 90 which slope downward and converge at the center 92 of the block 86. A recess 94, formed by the two downward sloping planar surfaces 90 is preferably V-shaped, although any recess 94 capable of allowing significant light to emit from the top surface 88 is within the scope of the present invention.

Beneath the planar under surface 96 of the block 86 is a reflection plate 98. Adjacent to both ends 100 of the block 86 are light sources 102, which include both day viewing lamps and night viewing lamps. Behind the lamps 102 are curved reflection plates 104, which ensure efficient illumination of the block 86. Located above the top surface 88 is a diffuser filter 106 to ensure uniform illumination of an LCD 60‴. It is also possible to simply coat the planar surfaces 90 of block 86 with diffusion material, thus eliminating the need for a diffusion filter.

Figure 8:
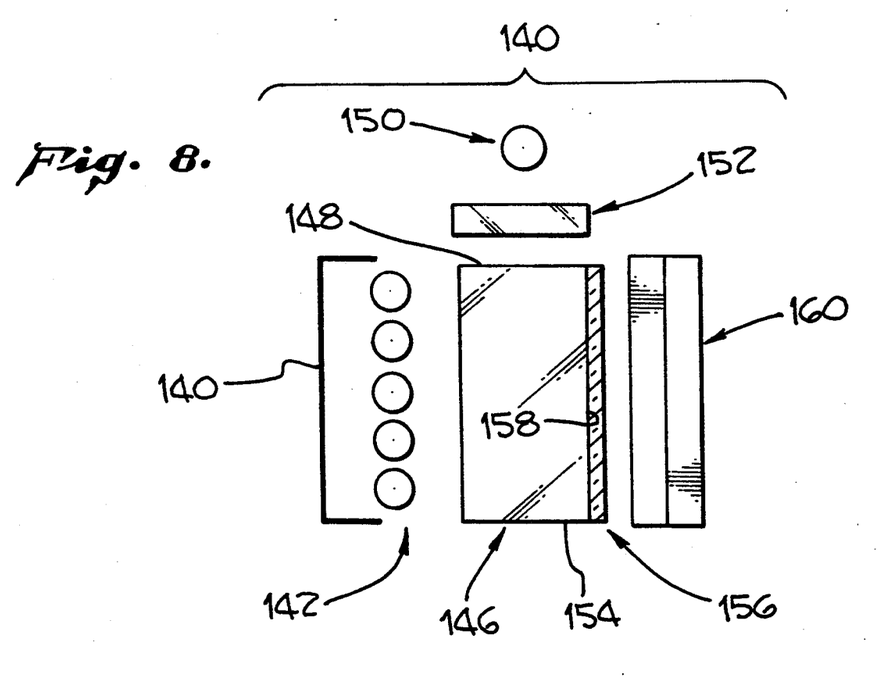
FIG. 8 is an exploded side view of a generalized LCD backlight device according to the present invention, which uses a back light for day viewing and is edgelit for night viewing.

FIG. 8 is illustrative of a more generalized display assembly block 140 of the present invention, and shows, in the broadest scope, the combination of a high brightness fluorescent backlight 142, coupled with reflective surface 144, for day viewing, and an edge-lit, translucent or transparent block 146 illuminated through the edge surface 148 of the block 146 with light from night lamp 150, which is made compatible with night vision goggles. External drive circuitry permits independent adjustment of the luminance of lamps 142 and lamp 150.

The two sets of lamps 142, 150 operate under complementary conditions. For day viewing, or night viewing without night vision goggles, only the high brightness, fluorescent backlighting lamps 142 are illuminated. During use with night vision goggles, only the edge lighting night lamp 150 is illuminated. Obviously, though, the night lamp 150 can be operated in combination with the day lamps 142 without untoward effects during daylight viewing because of its low luminance compared to lamps 142.

The lighting system 140 is made compatible with night vision systems either by selecting the night lamp 150 from a class of lamps which do not emit light of the unwanted wavelengths in the infrared or near infrared ranges, or by adding either an absorptive or reflective filter 152 between the night lamp 150 and the edge surface 148 of the block 146. The latter would require a change in the emission characteristics of the night lamp 150 (compared to the day lamps 142) to preserve similar colors for both night and day operation since, as has been mentioned, filtration to remove infrared light also tends to attenuate the longer wavelengths within the visible spectrum. In either case, no filtration of the day fluorescent lamps 142 is required, resulting in higher luminous efficiency and better color separation for day viewing.

In the generalized embodiment of the invention as shown in FIG. 8, a translucent edgelit block 146 can function as a diffuser for the day lamps 142. Therefore, rather than putting a reflective surface behind the block as in FIG. 2, a reflecting surface 144 is instead placed behind the fluorescent day lamps 142. This permits the transmission of light from the day lamps 142 through the under surface 154 of the block 146 without being impeded by a reflective coating which might otherwise be placed on the underside 154 of the block 146 as in FIG. 2. A diffuser plate 156 is placed at the front surface 158 of the edgelit block to enable good uniformity of light transmission from the day lamps 142 and the night lamp 150 through an LCD 160.

The night lamp 150 for this application could be incandescent, fluorescent, or of other lamp types, any of which are within the scope of this invention. As in the preferred embodiment, a miniature, cold cathode fluorescent lamp is used. A reflector housing could be used for the night lamp similar to that used for the day lamps, but, as in FIG. 3, an aperture lamp, could be utilized.

As can be seen, the particular shape of the block 146 is not important. What is significant is the provision of both the broad day illumination which directly illuminates the LCD for day viewing and the night vision illumination which is provided at the edge of the block. While both sources of illumination could be enabled for day time viewing, only the night lamps would be used in conjunction with night vision equipment.

Other variations and modifications will occur to those skilled in the art. Accordingly, the present invention should be limited only by the scope of the claims appended hereto.

What I claim is:

1. An LCD lighting system compatible with day and night vision equipment including an LCD display and comprising:
    a truncated wedge-shaped block of light transmitting material, having a substantially planar display surface and a substantially planar under surface, said surfaces converging at an acute optimum angle, and an end surface at said truncated end;
    a first light source, capable of emitting full spectrum visible light, said first light source being adjacent to a block surface such that light from said first light source enters said block through said surface;
    a second light source, including selecting means for limiting the emission of longer wave infrared and near infrared light, said second light source being adjacent to said end surface such that light from said second light source enters said block through said end surface; and
    means for disabling said first light source during night viewing, whereby light from said first and second sources is emitted from said planar display surface through said diffusing means.

2. The LCD lighting system according to claim 1, further including means for independently adjusting the luminance of said first and second light sources.

3. The LCD lighting system according to claim 1, wherein said first light source is positioned adjacent said under surface, said system further including reflection means located behind said first light source and incorporated as part of said second light source for maximizing the amount of light from said first and second light sources that emits from said planar display surface.

4. The LCD lighting system according to claim 1 wherein the two remaining sides of said wedge-shaped block have reflection means adapted to maximize the amount of light from said first and second light sources that exits from said planar display surface.

5. The LCD lighting system according to claim 1 wherein said selecting means include a filter placed between said second light source and said block.

6. The LCD lighting system according to claim 1 wherein said second light source includes lamps selected from a class of lamps which only emit light compatible with night vision systems.

7. The LCD lighting system according to claim 1 further including means for disabling said second light source during daytime viewing.

8. The LCD lighting system according to claim 1 further including means between said block and the LCD for diffusing light emitted from said block before reaching the LCD display.

9. The LCD lighting system according to claim 1 further including a second truncated wedge-shaped block, said wedge-shaped blocks being joined together at the truncated ends to form of a generally rectangular block having a bottom surface through which light from said first light source is able to pass, said second light source further including a lamp and selecting means adjacent the other one of said end surfaces, whereby said second light source applies light to opposite ends of said block.

10. The LCD lighting system according to claim 1 wherein said first light source is adjacent to said end surface such that light from said first light source enters said block through said end surface.

11. The LCD lighting system according to claim 10 wherein said planar underside and the two remaining sides of said wedge-shaped block include reflective means adapted to maximize the amount of light emitted from said planar display surface.

12. The LCD lighting system according to claim 10 further having means for disabling said second light source during daytime viewing.

13. LCD lighting system according to claim 10 further including a second truncated wedge-shaped block, said wedge-shaped blocks being joined together at the truncated ends to form a generally rectangular block having two end surfaces through which light from said first and second light sources is able to pass.

14. An LCD lighting system according to claim 13 further including reflective means for said planar under surface whereby light from said first and second light sources is reflected towards the LCD display through said diffusing means.

15. The LCD lighting system according to claim 13 wherein said first light source is on one end of said block and said second light source is on the other, opposite end of said block.

16. An LCD lighting system including an LCD element, said system being compatible with night vision equipment comprising:
a generally rectangular block consisting of a transparent material, said block having
a top display surface having a recess that increases in depth toward a center of said block;
two end surfaces opposite each other and adjacent to an edge of said top display surface wherein said recess is at a minimum;
first light source means capable of emitting a full spectrum of visible light, said first light source means being adjacent a surface such that light from said first light source means enters said block through said surface and is emitted through said display surface;
second light source means including selecting means to limit the emission of infrared and near infrared light, said second light source means being adjacent to at least one of said end surfaces such that light from said second light source means enters said block through an end surface and is emitted through said display surface;
means for disabling said first light source means during night viewing; and
light diffusion means between said rectangular block and the LCD for diffusing light emitting from said block before reaching the LCD display.

17. The LCD lighting system according to claim 16 wherein said recess is V-shaped and is formed by two equivalent planar surfaces of the top display surface, said planar surfaces sloping downward and converging in the center of the block, the highest point of said top display surface being the convergence of each of said planar surfaces with its corresponding edge surface, and the lowest point being the convergence of said planar surfaces in the center of said block.

18. The LCD lighting system according to claim 16 wherein said first light source means adjacent said bottom surface so that light from said first light source means enters said block through said bottom surface.

19. The LCD lighting system according to claim 16 wherein said first light source means are adjacent at least one of said end surfaces and wherein said bottom surface, as well as the two remaining sides of said block, include reflecting means adapted to maximize the amount of light emitting from said planar display surface.

20. The LCD lighting system according to claim 16 further including means for independently adjusting the luminance of said first and second light source means.

21. An LCD lighting system compatible with night vision equipment comprising:
a back lit LCD display element;
first and second truncated, wedge-shaped blocks of light transmitting material, said block having a planar display surface and a planar under surface which converge at an acute optimum angle, said block having an end surface at said truncation; and
first light source means including selecting means for limiting the emission of infrared and near infrared light, said first light source means being adjacent to said end surface of said first block such that light from said first light source means enters said first block through said end surface of said first block, said acute angle of said first block being chosen to optimize the amount and quality of light from said first light source means emitted from said planar display surface of said first block;
second light source means capable of emitting a full spectrum of visible light, said second light source means being adjacent to said end surface of said second block such that light from said second light source means enters said second block through said end surface of said second block, said acute angle of said second block being chosen to optimize the amount and quality of light from said second light source means emitted from said planar display surface of said second block; and
reflective means adjacent to said planar under surface of said second wedge-shaped block,
said first and second wedge-shaped blocks being arranged so that light from said first and second light sources is able to emit from said emission surface of said first block.

22. The LCD lighting system according to claim 21 further including means for diffusing light emitted from said first block before reaching the LCD display.

23. The LCD lighting system according to claim 21 further including said planar display surface of said second block being adjacent to said planar under surface of said first block such that light from said second light source means enters said second block through said end surface of said second block enters said first block from said under surface of said first block and light is emitted from said display surface of said first block.

24. The LCD lighting system according to claim 21 further including control means for disabling said second light source means during night viewing.

25. The LCD lighting system according to claim 23 further including means for independently adjusting the luminance of the light emitted by said first and second light source means.

26. An LCD lighting system compatible with day and night vision equipment comprising:
 a block of light transmitting material, having a display surface and an under surface and an end surface;
 a first light source, capable of emitting full spectrum visible light, said first light source being adjacent to said under surface such that light from said first light source enters said block through said under surface;
 a second light source, including selecting means for limiting the emission of infrared light, said second light source being adjacent to said end surface such that light from said second light source enters said block through said end surface; and
 means for disabling said first light source during night viewing.

27. The LCD system according to claim 26 further including means between said block and an LCD for diffusing light emitted from said block before reaching the LCD display.

28. The LCD lighting system according to claim 26, further including reflection means located behind said second light source adapted to maximize the amount of light from said first and second light sources that is emitted from said display surface.

29. The LCD lighting system according to claim 26 wherein the two sides of said block have reflection means adapted to maximize the amount of light from said first and second light sources that exits from said display surface.

30. The LCD lighting system according to claim 26 wherein . said selecting means include a filter placed between said second light source and said end of said block.

31. The LCD lighting system according to claim 26 wherein said selecting means include a second light source selected from a class of lamps which only emit light compatible with night vision systems.

32. The LCD lighting system according to claim 26 further including means for disabling said second light source during daytime viewing.

33. The LCD lighting system according to claim 26 further including means for independently adjusting the luminance of the light emitted by said first and second light source means.

* * * * *

UNITED STATES PATENT AND TRADEMARK OFFICE
CERTIFICATE OF CORRECTION

PATENT NO. : 5,211,463
DATED : May 18, 1993
INVENTOR(S) : MICHAEL H. KALMANASH

It is certified that error appears in the above-indentified patent and that said Letters Patent is hereby corrected as shown below:

In Column 8, line 52, change "diffusing means" to --block--.

Signed and Sealed this

Thirty-first Day of May, 1994

Attest:

BRUCE LEHMAN

*Attesting Officer*  *Commissioner of Patents and Trademarks*